(12) United States Patent
Hein et al.

(10) Patent No.: US 6,381,196 B1
(45) Date of Patent: Apr. 30, 2002

(54) SINTERED VISCOELASTIC PARTICLE VIBRATION DAMPING TREATMENT

(75) Inventors: Kenneth D. Hein, Severna Park, MD (US); Christopher F. Stack, Broomall, PA (US); Michael L. Drake, Pleasantview, UT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 14 days.

(21) Appl. No.: 09/696,702

(22) Filed: Oct. 26, 2000

(51) Int. Cl.$^7$ .................................................. H04K 3/00
(52) U.S. Cl. ............................................................. 367/1
(58) Field of Search ............................... 367/1; 252/62; 181/207

(56) References Cited

U.S. PATENT DOCUMENTS

| | | |
|---|---|---|
| 3,110,262 A | 11/1963 | West |
| 3,130,700 A | 4/1964 | Peterson |
| 4,173,130 A | 11/1979 | Sutliff et al. |
| 4,350,233 A | 9/1982 | Buckley |
| 4,560,150 A | 12/1985 | Shtarkman |
| 4,706,788 A | 11/1987 | Inman et al. |
| 5,093,810 A * | 3/1992 | Gill ................................ 367/1 |
| 5,538,774 A | 7/1996 | Landin et al. |
| 5,552,209 A | 9/1996 | McCutcheon |
| 5,775,049 A | 7/1998 | Fricke |
| 5,820,348 A | 10/1998 | Fricke |
| 5,849,819 A | 12/1998 | Phillipps |
| 5,924,261 A | 7/1999 | Fricke |
| 6,056,259 A | 5/2000 | Lahham |

OTHER PUBLICATIONS

Geoffrey J. Frank, Michael L. Drake and Steven E. Olson, "Modeling of Damping in Tubes Using Viscoelastic Beads," Aerospace Mechanics Division, University of Dayton Research Institute (UDRI), Dayton, Ohio 45469–0110, Final Technical Report, Dec. 1995, UDR–TR–79, Prepared for Naval Surface Warfare Center, Carderock Division, Annapolis, Maryland 21402, Contract No. N00167–94–C–0097.

OTHER PUBLICATIONS msphere.com/ (1 p).
msphere.com/about.htm (3 pp).
msphere.com/micros.htm (2 pp).
msphere.com/geltac.htm (2 pp).
msphere.com/geltacm.htm (2 pp).
msphere.com/microe.htm (2 pp).
msphere.com/whatsnew.htm (2 pp).
msphere.com/contact.htm (1 p).
msphere.com/links.htm (1 p).

* cited by examiner

Primary Examiner—Daniel T Pihulic
(74) Attorney, Agent, or Firm—Howard Kaiser

(57) ABSTRACT

A damping entity comprises a matrix of plural viscoelastic particles, typically between 0.05 in and 0.5 in in size, which slightly and fixedly contact one another. The particles generally bond with each other at their contact zones and approximately correspondingly therewith. Suitable particle viscoelasticities are defined by either or both of: (i) an approximate shear modulus range between 10 p.s.i. and 100,000 p.s.i.; and, (ii) an approximate loss factor range between 0.05 and 1.5. The particles which describe the matrix can be essentially identical in terms of size, shape and material composition, or can vary among themselves in one or more of these respects. These properties can be selected uniformly or more or less nonuniformly among the particles of a particular matrix in order to imbue the matrix with desired damping characteristics, e.g., in terms of frequency ranges and temperature ranges. The cumulative matrix mass resonates at "tuned" frequencies and thereby dampens the vibrating structure to which it is applied.

36 Claims, 13 Drawing Sheets

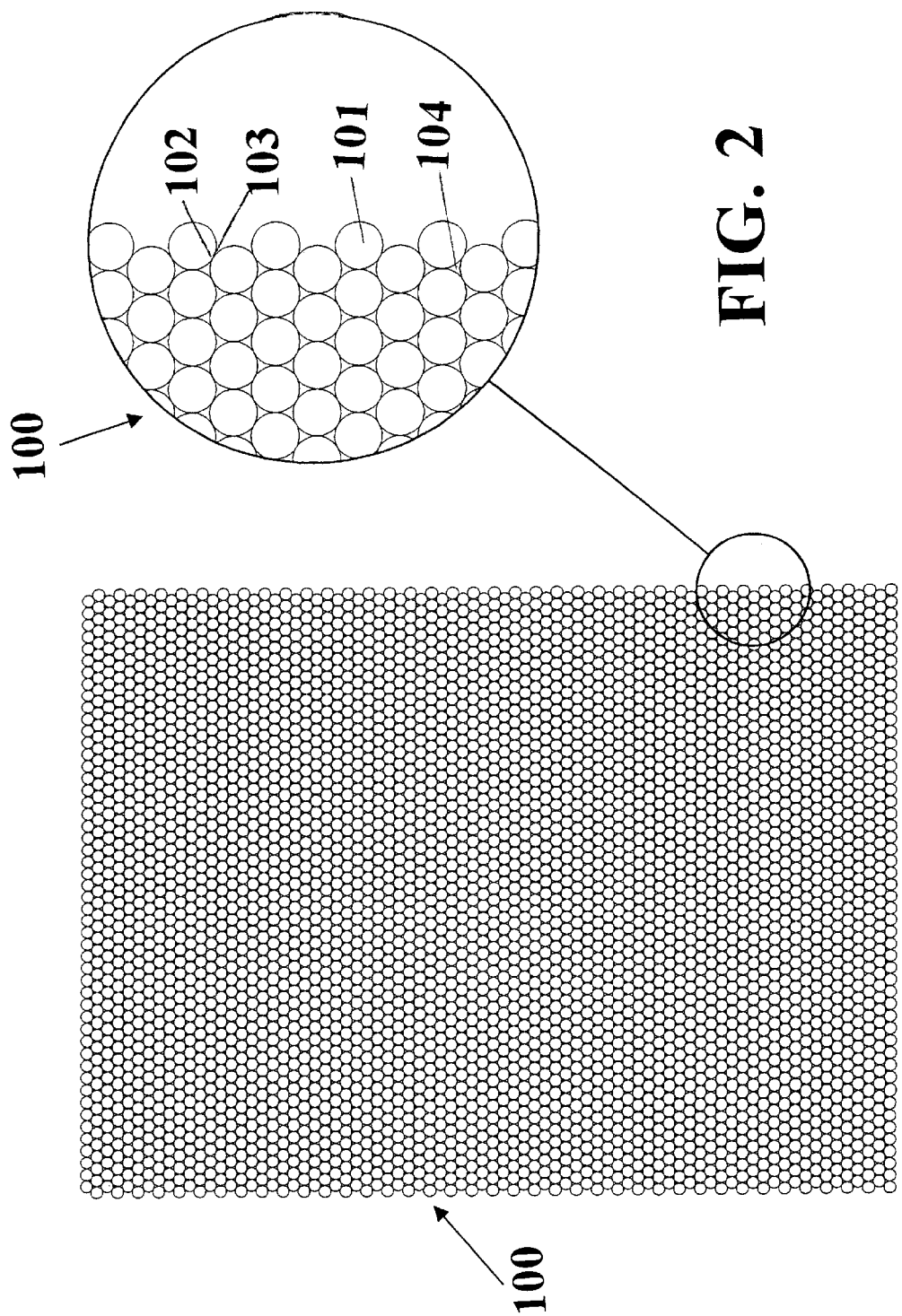

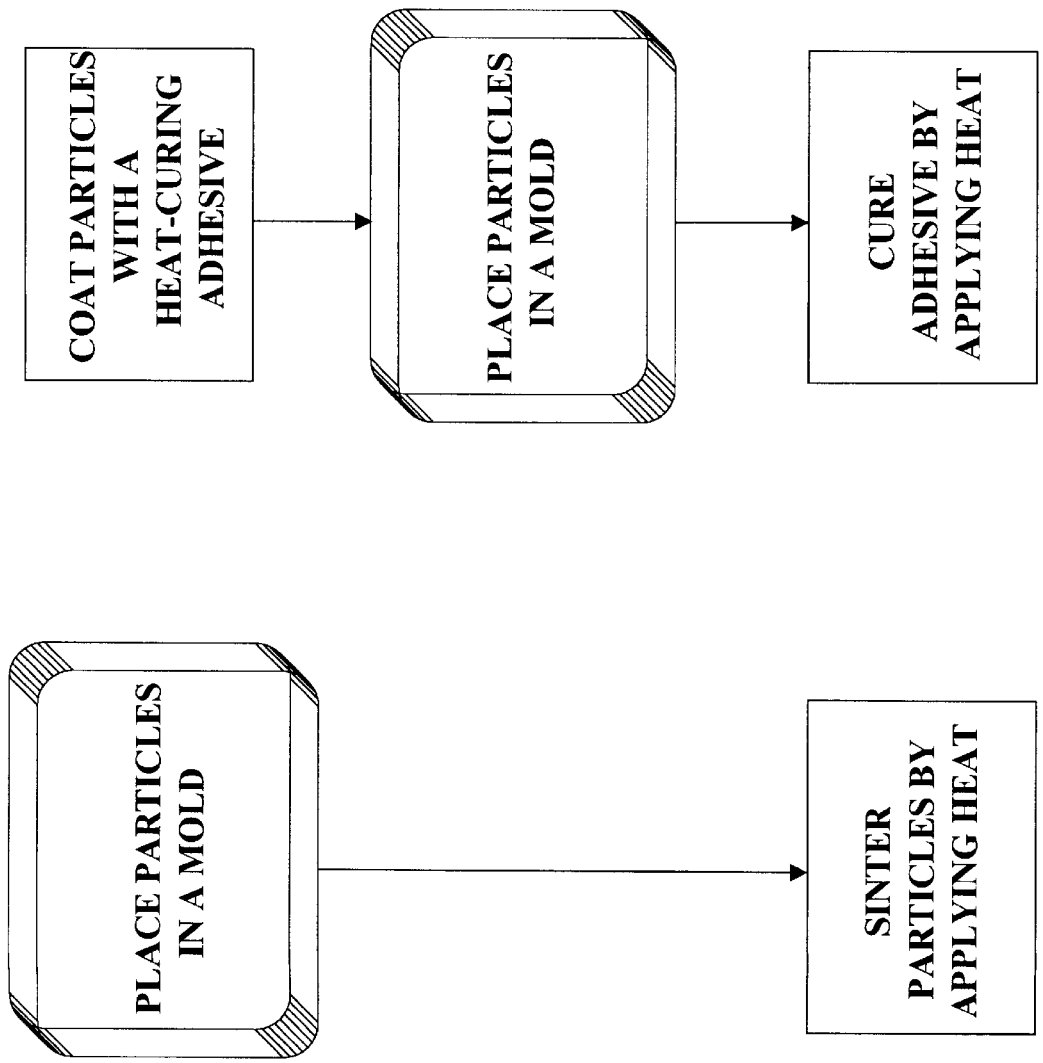

SINTERED VISCOELASTIC PARTICLE VIBRATION DAMPING TREATMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods and apparatuses for damping vibration, more particularly for attenuating acoustic vibration such as structureborne noise.

Vibrations can cause problems such as structural weakening, metal fatigue and bothersome noise. Of particular note are situations wherein a power-driven source (e.g., a motor) produces a frequency at which an attached structure naturally vibrates, a phenomenon known as "resonance."

Various types of passive damping treatments have been known to be effective in reducing the amplitude of vibrations at resonant frequencies. Among the known effective passive damping methodologies are freelayer damping, constrained layer damping, tuned damping and direct-load-path damping.

According to freelayer damping, damping material is positioned on the to-be-damped structure. When the structure is excited, the damping material and the structure vibrate together. This causes the damping material to stretch and compress, resulting in the dissipation of vibration energy as heat According to constrained layer damping, damping material is positioned against the structure and covered with a constraining layer, such as a metal sheet In other words, the damping material is sandwiched between the constraining layer and the structure. The mechanism between the constraining layer and the structure is shear in nature.

According to tuned damping, damping material acts as a spring-mass system which is tuned to vibrate at a frequency of interest, e.g., the same frequency as the structural vibration of the structure on which it is mounted. The tuned damper vibrates out-of-phase with the structure and applies a force opposite the motion of the structure.

According to direct-load-path damping, a discrete location of the structure is damped by load-bearing damping material. In contrast, freelayer damping and constrained layer damping afford area coverage of the structure.

Generally, tuned damping provides narrowband damping, designed to concentrate damping where most needed, i.e., at the frequencies of resonance modes. By comparison, freelayer damping, constrained layer damping and direct-load-path damping provide broadband damping, designed to afford more moderate damping over a wider range of frequencies.

The United States Navy has recently begun evaluating new mechanisms in association with a family of damping treatments, viz., entrained damping, which utilizes particulate material. According to entrained damping, a hollow space in a structure to be damped is filled with particulate damping material. Particles such as sand or polymeric (e.g., viscoelastic) beads have been demonstrated by the U.S. Navy to provide effective structureborne noise attenuation when used as a filler for noise-critical structures.

In particular, the U.S. Navy has experimentally found that this particle-filler type of damping treatment can be adapted to effectuate a kind of tuned damping; that is, the particle filler can act as a tuned absorber, wherein the vibration of the structure couples into the particle filler. At the fundamental frequencies, where the structural vibration coincides with the standing wave resonance modes through the thickness of the particle filler, very high levels of structural damping have been achieved in proprietary testing conducted by the U.S. Navy.

The mechanisms associated with the above-described "particle-type" tuned damping are not clearly understood; nevertheless, considered likely by U.S. Navy researchers are several mechanisms which influence the high levels of damping obtained.

One mechanism associated with tuned-particle-type damping is believed to be the relative rigid body displacement between the particles of the filler, which adds a frictional or coulomb-type damping to the structure. This mechanism is likely the dominant one for a structure filled with sand; the sand particles, made of quartz or other mineral base material, are very stiff with extremely low levels of inherent material damping.

Another mechanism associated with tuned-particle-type damping is believed to be present for viscoelastic-type filler materials. This effect also occurs at the interface of the individual particles. When an acoustic wave is transmitted through a solid material, the pressure is relatively evenly distributed through the material across any section whose dimensions are small relative to the wavelength. In the case of a medium made up of particles, however, the point contact between each particle forces a pressure concentration and subsequent strain-increase at each particle interface as the pressure wave is transmitted. The strain concentration at each contact point has the effect of multiplying the viscoelastic effect of the base material over an equivalent solid material.

Hence, the U.S. Navy has been evaluating, with good success, the application of free viscoelastic particle damping treatments to entraining structures (i.e., structures which can be filled). The U.S. Navy has especially been assessing the application of free viscoelastic particle damping treatments of a tuned-particle-type to entraining structures. The U.S. Navy is currently desirous of effectuating, with respect to non-entraining structures (i.e., structures which cannot be filled, such as plates, or piping having working fluid inside), damping treatments having attributes of both entrained damping and tuned damping.

SUMMARY OF THE INVENTION

In view of the foregoing, it is an object of the present invention to provide method and apparatus for effectuating, with respect to a non-entraining structure, a damping treatment which is similarly effective as is a tuned-particle-type damping treatment with respect to an entraining structure.

It is a further object of the present invention to provide such method and apparatus which effectuate same in an efficient and effective manner.

In accordance with many embodiments of the present invention, a passive vibration damping device comprises plural viscoelastic particles which generally cohere with one another. At least substantially every said particle is characterized by: (a) adherent communication with at least one other particle; (b) adjacency to at least one separation between the particle and at least one other particle; and, (c) at least one of: (i) an approximate shear modulus in the range between about 10 p.s.i. and about 100,000 p.s.i. inclusive; and, (ii) an approximate loss factor in the range between about 0.05 and about 1.5 inclusive. According to typical practice, the adherent communication includes a contact region between two particles, and a bond region between the two particles, whereing the bond region is at least approximately commensurate with the contact region. Frequent inventive practice prescribes particle sizes wherein at least substantially every particle is characterized by size (as taken along its greatest dimension) in the range between about 0.05 inches and about 0.5 inches inclusive.

Further provided by the present invention is a method for effectuating passive damping of an object The method comprises: (a) providing a device including plural viscoelastic particles which generally cohere with one another; and (b) coupling the device with the object. At least substantially every particle is characterized by: (a) adherent communication with at least one other particle; (b) adjacency to at least one separation between the particle and at least one other particle; and, (c) at least one of: an approximate shear modulus in the range between about 10 p.s.i. and about 100,000 p.s.i. inclusive; and an approximate loss factor in the range between about 0.05 and about 1.5 inclusive. Typically according to inventive practice, at least substantially every said particle is characterized by size in the range between about 0.05 inches and about 0.5 inches inclusive.

Further provided by the present invention is a method for making a device suitable for passively damping a structure. The method comprises: (a) providing plural viscoelastic particles; (b) placing the particles in a mold; and (c) causing the particles to generally cohere with one another. At least substantially every particle is characterized by: (a) adherent communication with at least one other particle; (b) adjacency to at least one separation between the particle and at least one other particle; and, (c) at least one of: an approximate shear modulus in the range between about 10 p.s.i. and about 100,000 p.s.i. inclusive; and an approximate loss factor in the range between about 0.05 and about 1.5 inclusive. Typically according to inventive practice, at least substantially every said particle is characterized by size in the range between about 0.05 inches and about 0.5 inches inclusive.

The "shear modulus" (also known as the "modulus of elasticity in shear," "modulus of rigidity" or "coefficient of rigidity) is a measure of the resistance of a material to shearing stress. The shear modulus equals the shearing stress divided by the resultant angle of deformation (typically expressed in radians). The "loss factor" is the specific damping capacity per radian of the damping cycle. Damping can be defined in terms of energy dissipation and the peak potential energy as $\eta = \Delta U / 2\pi U_{max}$, where $\eta$ is the loss factor, $U_{max}$ is the peak potential energy, and $\Delta U$ is the energy dissipated (e.g., change in potential energy). The loss factor, $\eta$, is equal to the ratio between the energy dissipated per radian, $\Delta U/2\pi$, and the peak potential energy, $U_{max}$.

The present invention provides a methodology for efficiently and effectively practicing tuned-particle-type damping treatment with respect to non-entraining structures. Inventively featured is the adhering (e.g., sintering) of viscoelastic particles to each other so as to form a continuous, self-supporting, easily attachable matrix of such particles. In particular, a key feature of this invention is the development of self-supporting bonds between the particles that make up the body of the damping material; a bond is developed at each of the contact points between the particles. Advantageously, the inventive matrix of viscoelastic particles is easily affixable to non-entraining structures.

The application of particles or a "particulate quality" to non-entraining structures represents a difficult practical challenge which, if not overcome, would limit such application. The present invention solves this problem.

According to typical embodiments of this invention, sintered particle material is used as a damped tuned vibration absorber for structural noise attenuation. The damping material comprises a matrix (array or arrangement) of plural, approximately spherical viscoelastic particles (also appropriately described as "pellets", "beads," "spheres" or "microspheres") which slightly and fixedly contact one another. The particles, at least approximately spherical, are set so as to minimally touch, but not impinge upon, each other. When thus disposed, the particles esssentially or substantially retain their original spherical character, at the same time constituting a unified whole.

Inventive practice does not necessarily prescribe a spherical or near-spherical shape of the viscoelastic particles, or that they be uniformly sized, or that they be made of the same material. Varieties of particle sizes, particle shapes (spherical or otherwise) and particle material compositions are inventively practicable. According to diverse inventive embodiments, the viscoelastic particles can vary in size and/or shape and/or material. In this regard, regardless of the combinations and configurations of particles, it is inventively required that the viscoelastic particles be fixedly contiguous with respect to each other, but that they not be entirely contiguous (i.e., that they be "slightly," "partially," "moderately," "discretely," "noncontinuously" or "nonsolidly" contiguous) with respect to each other; in other words, the particles define spaces, gaps or interstices therebetween which remain in the matrix.

The viscoelastic particles are adhered to each other in a manner which maintains the pressure and strain concentration points while not allowing individual particles to be released from the matrix. According to many inventive embodiments, a structureborne noise attenuating treatment comprises viscoelastic particles which have been fused together to provide a coherent mass which is self-supporting.

Other objects, advantages and features of this invention will become apparent from the following detailed description of the invention when considered in conjunction with the accompanying drawings.

BRIEF DESCRIPTION OF THE APPENDICES

The following appendices are hereby made a part of this disclosure:

Attached hereto marked "APPENDIX A" and incorporated herein by reference is the following 63-page report (2 title pages, pages i–v and pages 1–56): Geoffrey J. Frank, Michael L. Drake and Steven E. Olson, "Modeling of Damping in Tubes Using Viscoelastic Beads," Aerospace Mechanics Division, University of Dayton Research Institute (UDRI), Dayton, Ohio 45469-0110, Final Technical Report, December 1995, UDR-TR-95-79. This is a private, proprietary final report which was prepared for the Naval Surface Warfare Center, Carderock Division, Annapolis, Md., 21402, pursuant to Contract No. N00167-94-C-0097.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 1 is a diagrammatic plan view of an embodiment of a coherent (e.g., sintered) viscoelastic particle vibration damping device (e.g., configured as a sheet) in accordance with the present invention, wherein the particles of the inventive matrix system are approximately spherical and approximately the same size.

FIG. 2 is an enlarged and partial version of the view shown in FIG. 1.

FIG. 20 is a block diagram illustrating a method of fabrication of an inventive device wherein, in response to the application of heat, the particles are "sintered" with respect to each other.

FIG. 21 is a block diagram illustrating a method fabrication of an inventive device wherein the particles are coated with a material characterized by becoming adhesive while curing in response to the application of heat.

DETAILED DESCRIPTION OF THE INVENTION

Figure 3:
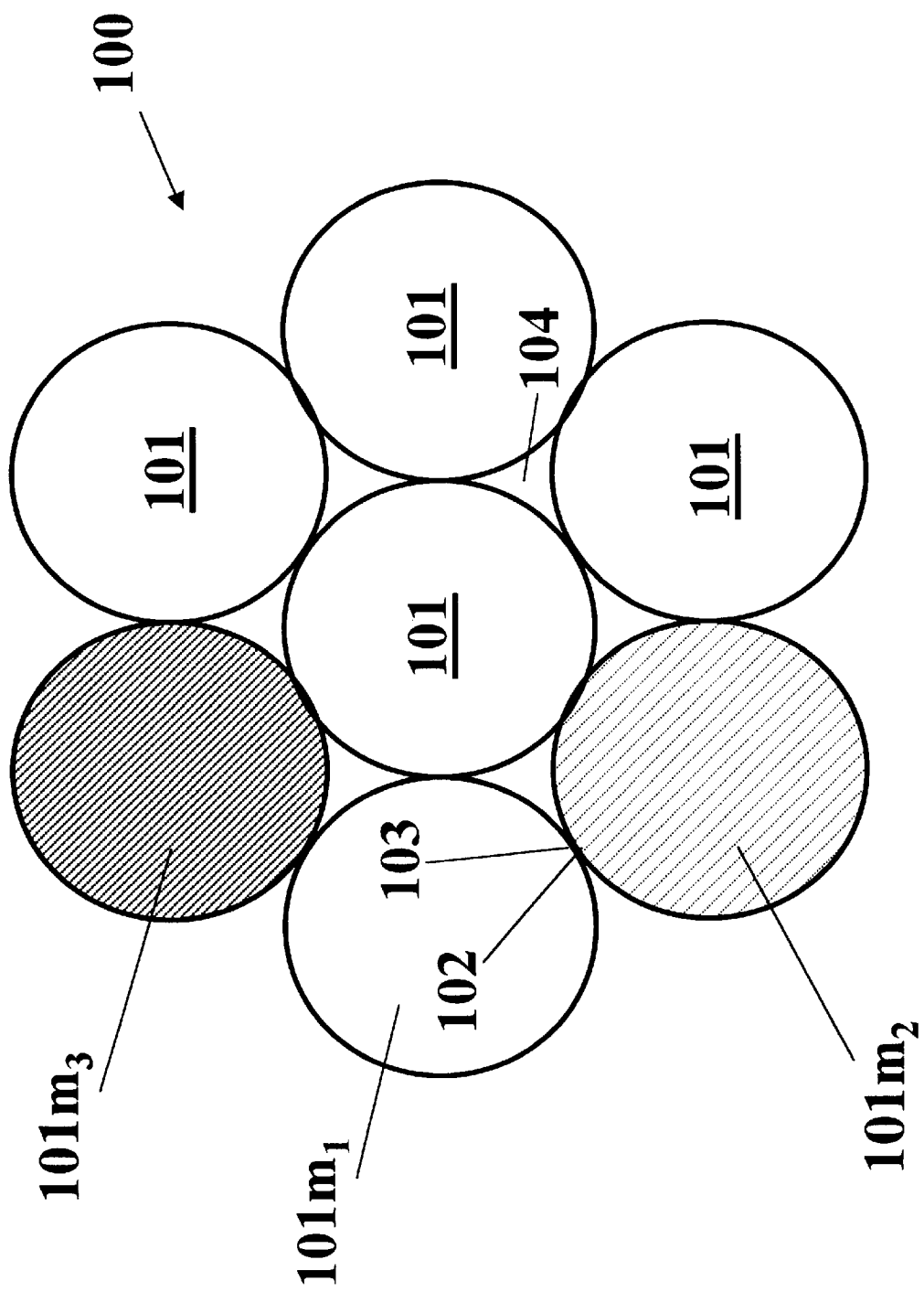
FIG. 3 is an enlarged and partial version of the view shown in FIG. 2.

Referring now to FIG. 1, FIG. 2 and FIG. 3, the fused viscoelastic particle damping material system comprises a matrix 100 of multitudinous particles 101. Particles 101 are joined together to form a coherent mass, matrix 100. As shown in FIG. 1 and in the increasingly detailed views of FIG. 2 and FIG. 3, particles 101 are approximately the same size and approximately the same shape. Particles 101 are bead-like or pellet-like entities, approximately spherical in shape.

FIG. 1 through FIG. 8 and FIG. 16 and FIG. 17 each illustrate an embodiment of inventive matrix 100. Each of these figures can be considered to be generally representative (e.g., in plan or cross-sectional view) of an inventive matrixs 100, regardless of the design of the inventive vibration damping matrix 100 device which comprises it. In other words, whether the inventive vibration damping matrix 100 device is in sheet or non-sheet form, the main inventive feature being depicted is that viscoelastic particles 101 are adhered (e.g., sintered) to each other so as to form such matrix 100, which can be configured as at least part of a matrix 100 device having any of a diversity of shapes. As shown in FIG. 1 through FIG. 4, approximately spherical viscoelastic particles 101 are adhered (e.g., sintered) to each other so as to form a matrix 100.

Figure 4:
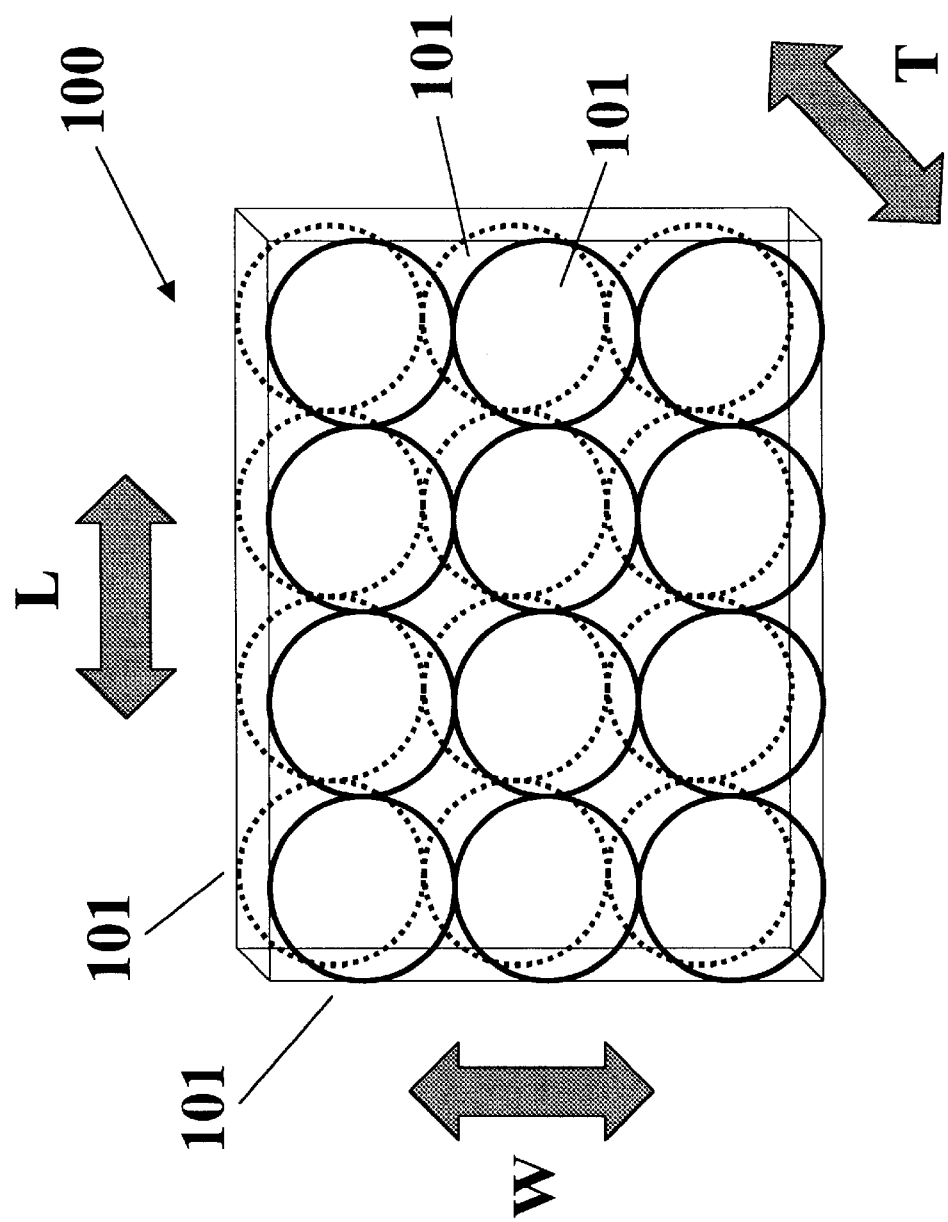
FIG. 4 is a diagrammatic perspective view of an embodiment of an inventive damping device similar to that shown in FIG. 1 through FIG. 3, illustrating a laminar or three-dimensional quality of the inventive matrix system.
Figure 5:
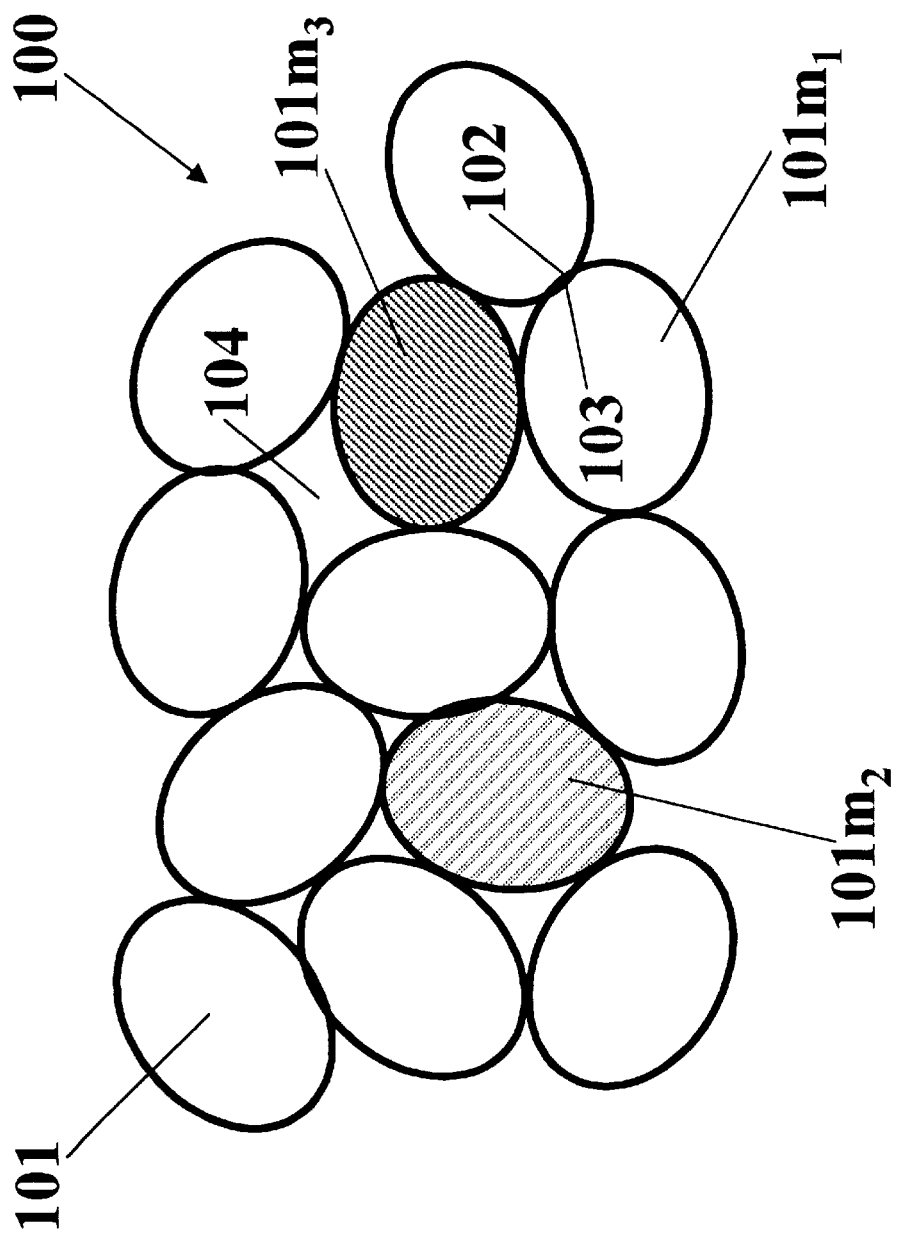
FIG. 5 is a diagrammatic plan view of an embodiment of an inventive matrix system wherein the particles are oblong, oblate spheroid, oval, elliptical or ellipsoid.

With reference to FIG. 4, it is seen that, according to this invention, matrix 100 need not be formed into a single layer of particles 101. Instead, many inventive embodiments are characterized by plural layers of particles 101; in other words, matrix 100 has a length L, a width W and a depth D, each dimension being at least twice the diameter of particle 101.

A principal feature of the present invention is the development of a self-supporting bond between the particles 101 that make up the body of the damping material 100. This bond, the bond 102 area as shown in FIG. 3, must be developed at each of the contact (particle interface) "points" 103 between the particles 101. The bond 102 region is approximately commensurate with (e.g, approximately coextensive with, or approximately coincident with) the contact region 103. Particles 101 have been adhered to each other via a process which maintains the small point contacts 103 between each particle 101. Once fused, individual particles 101 will be unable to escape from the matrix 100 without tearing the bonds 102 between particles 101.

FIG. 1 through FIG. 4 are "idealized" portrayals of uniformly sized spherical damping particles 101 being bonded together at the particle interface points 103 in matrix 100. Inventive practice does not necessarily prescribe such homogeneity or uniformity of the arrangement of particles 100; nor does inventive practice prescribe such a systematically "slight" touching at contact "points" 102, such as would be associated with an inventive matrix 100 having same-sized spherical particles 101, e.g., as shown in FIG. 1 through FIG. 4.

In each matrix 100 shown in FIG. 5 through FIG. 8, FIG. 16 and FIG. 17, particles 101 of disparate nonspherical shapes (and/or sizes) also exhibit interrelational contiguities 103 and collocational bond sites 102. As similarly portrayed in each of FIG. 1 through FIG. 8, FIG. 16 and FIG. 17, the particles form bonds 102 at contact regions 103. Depending on the dimensional and configurational characteristics of the particles 101 in a given matrix 100, the contact regions 102 will represent a higher or lower percentage of the total surface areas of the particles 101 within a particular matrix 100. In other words, spherical particles 101 shown in FIG. 1 through FIG. 4 bond at contact regions 102 which are practically contact "points." By comparison, contact regions 102 portrayed in FIG. 5 through FIG. 8, FIG. 16 and FIG. 17 tend to be greater in area and/or more prevalent.

An overriding criterion for inventive practice is that, irrespective of the overall configuration of matrix 100 in terms of particle 101 sizes, shapes and distributions, there generally exist voids 104—empty spaces, interspaces, gaps or interstices between and among the particles 101. Otherwise expressed, particles 101 should touch each other at appreciably less than one hundred percent of the collective surface areas of the particles 101. If voids 104 are too insubstantial or practically nonexistent, matrix 100 will be tantamount to a solid or continuous entity, and hence will be largely or completely ineffectual in effecting the kind of tuned vibrational damping which the present invention is intended to effect.

Inventively suitable viscoelastic particles are commercially available or commercially orderable. For instance, 3M Corp. manufactures a series of acrylic copolymers which could be supplied in pellet form. EAR, a division of Cabot, Inc., manufactures several polyvinyl-based polymers in pellet form. High density polyethylene is available from multiple manufacturers in pellet form. Basically, any polymer which can be made into a particulate entity or in discrete form, e.g., individual pellets, can be used in the present invention's damping system.

The inventive system can also use materials other than polymers, such as enamels and ceramics, which at some sufficiently high temperature will begin to behave viscoelastically. The temperature range over which the inventive damping system operates is controlled by the pellet material chosen. Polymers generally work in the low temperature range of −100 degrees F. to 600 degrees F. Enamels and ceramics would work in the temperature range of 600 degrees F. to several thousand degrees Fahrenheit (e.g., at least 5,000 degrees F.). In sum, any material which manifests an inventively appropriate viscoelasticity within a particular temperature range admits of inventive implementation to serve as the material of particles 101.

There are certain preconditions or parameters which physically define the ambit of viscoelastic materials which can be used in accordance with the present invention. Among the keys to the proper design of an inventive damping system embodiment are the following: (i) the damping system geometry (e.g., in terms of cross-section and length); (ii) the particle size; and, (iii) the particle material, especially in terms of shear modulus and loss factor.

The particle geometry affects the effective frequency range of the inventive damping concept. The particle size affects the damping system density and modulus, which are critical design parameters used to design the inventive damping system to attain the required damping performance. The particle material modulus and the particle loss factor affect the effective frequency range and the level of damping achieved. The inventive design process defines the relationship between and among (i) the damping system (especially, particle) geometry, (ii) the particle size and (iii) the particle material's shear modulus and loss factor—that is, the relationship therebetween which will meet the damping requirements for the structure which is intended to be dampened.

Generally, in accordance with the present invention, each particle will be characterized by a particle material shear modulus in the range between approximately 10 pounds per square inch and approximately 100,000 pounds per square inch, inclusive; additionally or alternatively, each particle will be characterized by a particle loss factor in the range between approximately 0.05 and approximately 1.5, inclusive.

Typically, according to typical inventive practice, the size of each particle (e.g., pellet) will fall in the range between approximately 0.05 inches and approximately 0.5 inches, inclusive. However, the overall inventive damping system design, including the material properties of the particles to be used, will determine the particle size. Generally, the inventive damping system will be designed to meet the damping requirements of the structural system to be damped.

According to many preferred inventive embodiments, all of the particles are approximately spherical, are approximately the same size, and are made of the same material. However, there are many inventive embodiments wherein there is a combination of particles having different physical characteristics in terms of size, shape and/or material. With reference to Table 1, below, inventive multiple frequency designs can be developed by using any combination of (a) identity (sameness, nondistinctiveness, similarity, uniformity or equivalence) and (b) difference (distinctiveness, differentiation, nonuniformity, dissimilarity or nonequivalence) among the three characteristics of size, shape and material.

As indicated by Table 1, the present invention can be practiced in various combinations of particle characteristics in terms of particle size, particle shape and particle material composition. The present invention admits of practice: (i) using same sized, same shaped particles made of the same material; (ii) using same sized, same shaped particles made of two or more different materials (i.e., at least two particles are made of different materials); (iii) using same sized, differently shaped particles made of the same material (i.e., at least two particles are differently shaped); (iv) using differently sized, same shaped particles made of the same material (i.e., at least two particles are differently sized); (v) using same sized, differently shaped particles made of two or more different materials (i.e., at least two particles are differently shaped, and at least two particles are made of different materials); (vi) by using differently sized, differently shaped particles made of the same material (i.e., at least two particles are differently sized, and at least two particles are differently shaped); (vii) by using differently sized, same shaped particles made of two or more different materials (i.e., at least two particles are differently sized, and at least two particles are made of different materials); or, (viii) by using differently sized, differently shaped particles made of two or more different materials (i.e., at least two particles are differently sized, at least two particles are differently shaped, and at least two particles are made of different materials).

The notions of "same size" and "different size" are straightforward in relation to particles having at least approximately the same shape. In relation to particles having different shapes, these notions connote dimensional comparability (equivalency) or dimensional incomparability (inequivalency) based on taking the greatest linear measurement through or across each particle.

TABLE 1.

Combinations of Particle Characteristics

| PARTICLE SIZE | PARTICLE SHAPE | PARTICLE MATERIAL |
| --- | --- | --- |
| same | same | same |
| same | same | different |
| same | different | same |
| different | same | same |
| same | different | different |
| different | different | same |

TABLE 1.-continued

Combinations of Particle Characteristics

| PARTICLE SIZE | PARTICLE SHAPE | PARTICLE MATERIAL |
|---|---|---|
| different | same | different |
| different | different | different |

Figure 16:
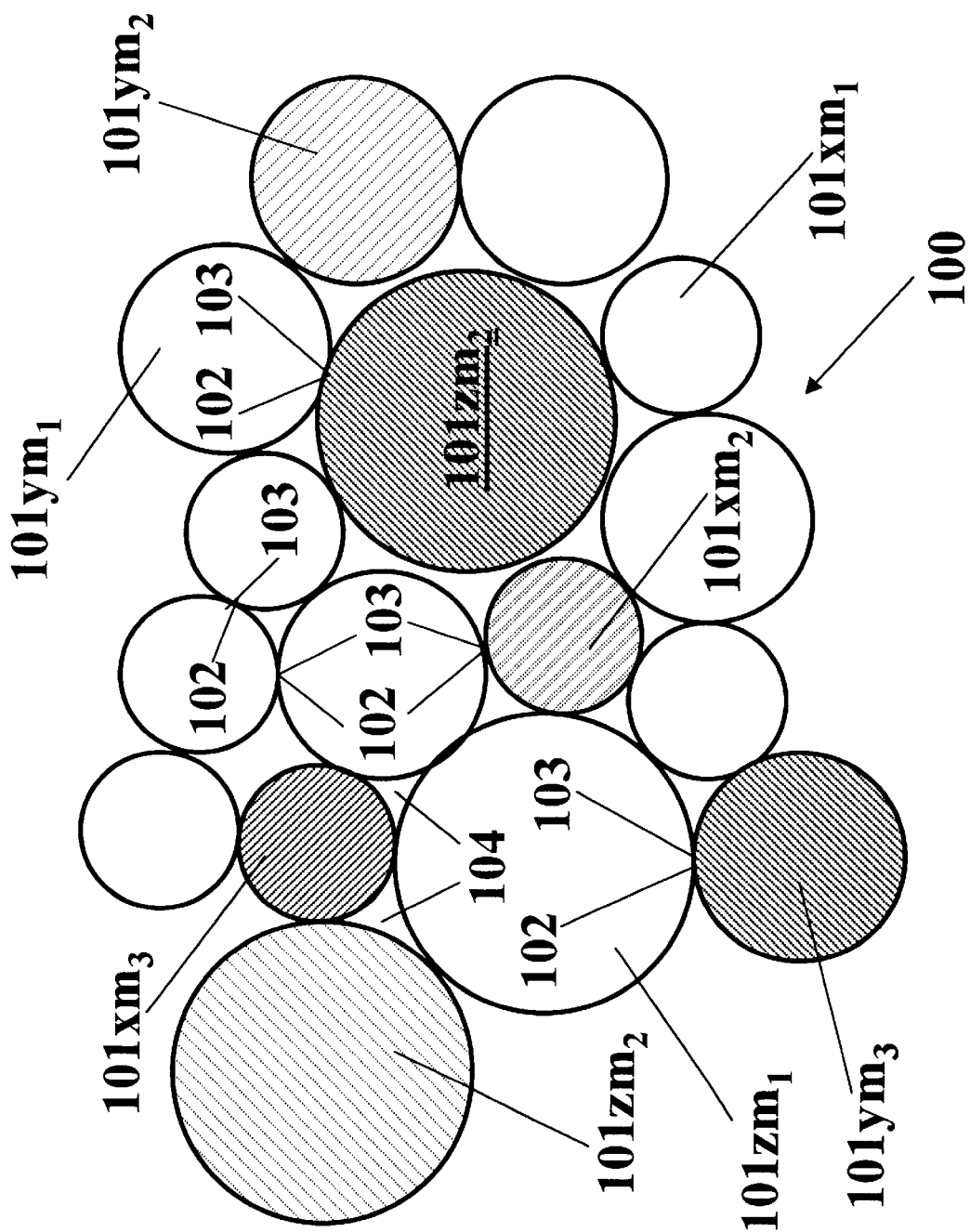
FIG. 16 is a diagrammatic plan view of an embodiment of an inventive matrix system wherein approximately spherical particles are variously sized.
Figure 17:
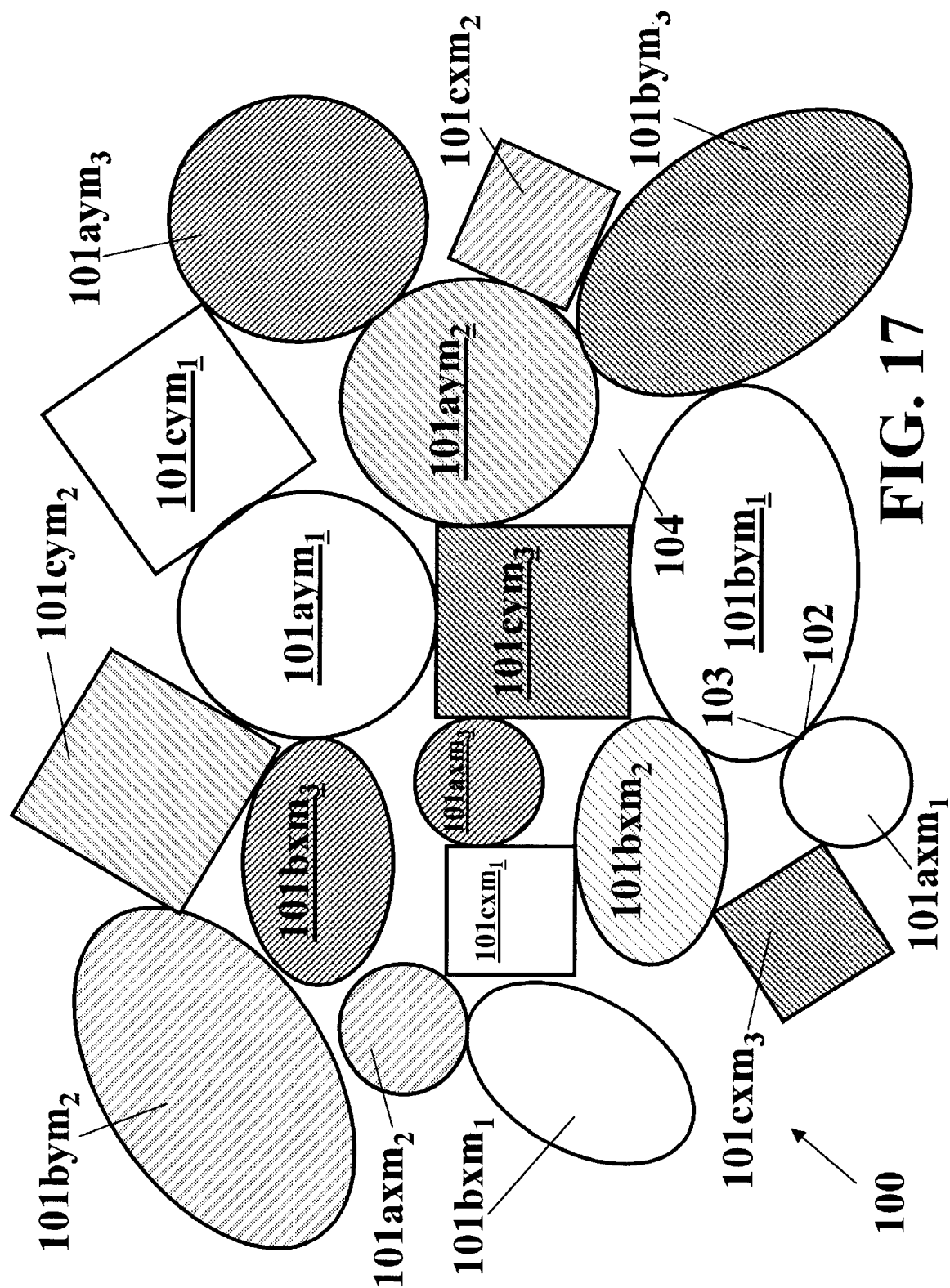
FIG. 17 is a diagrammatic plan view of an embodiment of an inventive matrix system comprising a "medley" of variously sized and shaped particles.

Still with reference to FIG. 1 through FIG. 4 and also with reference to FIG. 5 through FIG. 17, the commonalities and discrepancies between and among the particles in terms of the three criteria of particle size, particle shape and particle material will be prescribed by specific damping objectives in view of pertinent conditions and circumstances such as vibrational frequency(ies) and/or temperature effect(s). As shown in FIG. 5 through FIG. 15 and FIG. 17, shapes are inventively feasible other than approximately spherical shapes such as shown in FIG. 1 through FIG. 4 and FIG. 16. Variation in size of the same approximately spherical shape within matrix 100 is shown in FIG. 16. Variation in size of three different shapes (spherical, rectangular parallelepiped, oblate spheroid) within matrix 100 is shown in FIG. 17.

Figure 7:
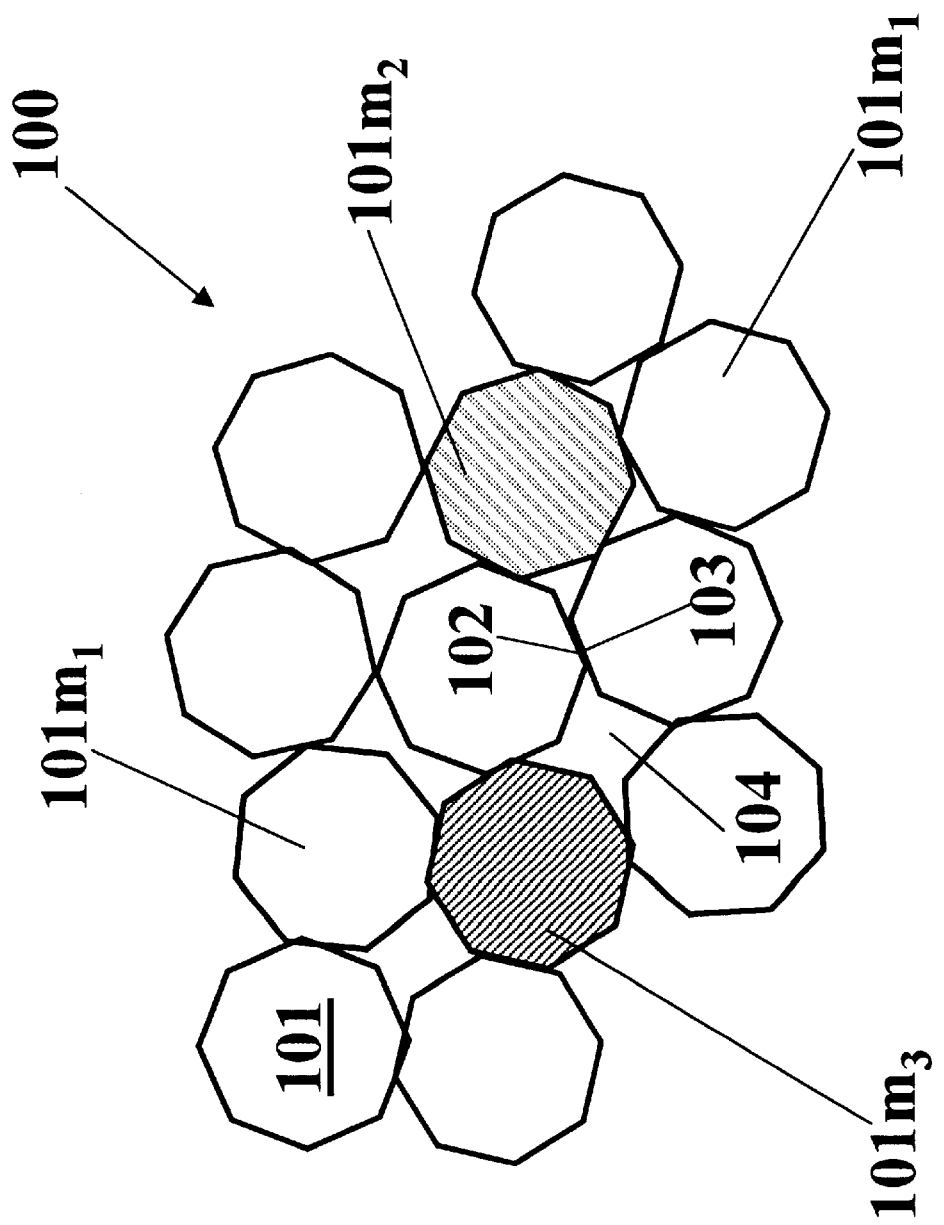
FIG. 7 is a diagrammatic plan view of an embodiment of an inventive matrix system wherein the particles are approximately octagonal polyhedral.
Figure 8:
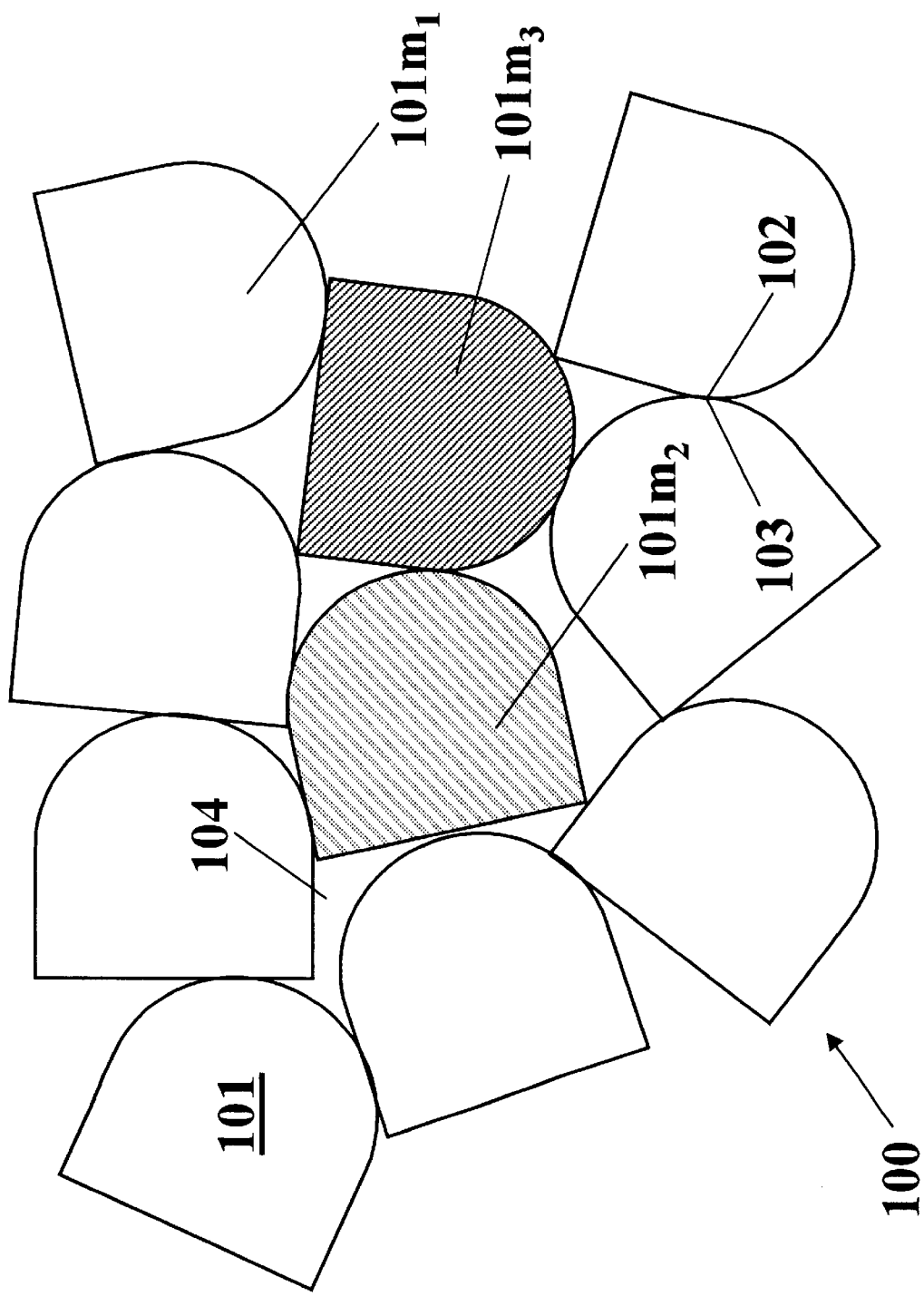
FIG. 8 is a diagrammatic plan view of an embodiment of an inventive matrix system wherein the particles have indicia of both rectilinearity and curvilinearity.

FIG. 7 depicts particles 101 describing an octogonal profile, and is more generally illustrative of particles 101 describing any of diverse polygonal profiles in two dimensions. Moreover, FIG. 7 can be considered to be representative of a variety of particle 101 shapes in three dimensions. For instance, particle 101 can essentially describe a shape that is characterized by angularity or rectilinearity but which also has indicia of curvedness or curvilinearity—e.g., an overall round geometric shape (e.g., a sphere or oval sphere) while having flat surfaces, "facets" or faces such as a jeweler would cut on a gemstone. FIG. 7 can also be considered to generally portray entirely rectilinearly polygonally shaped particles 101 such as three-dimensionally shown in FIG. 11, FIG. 12, FIG. 13 and FIG. 15.

Figure 6:
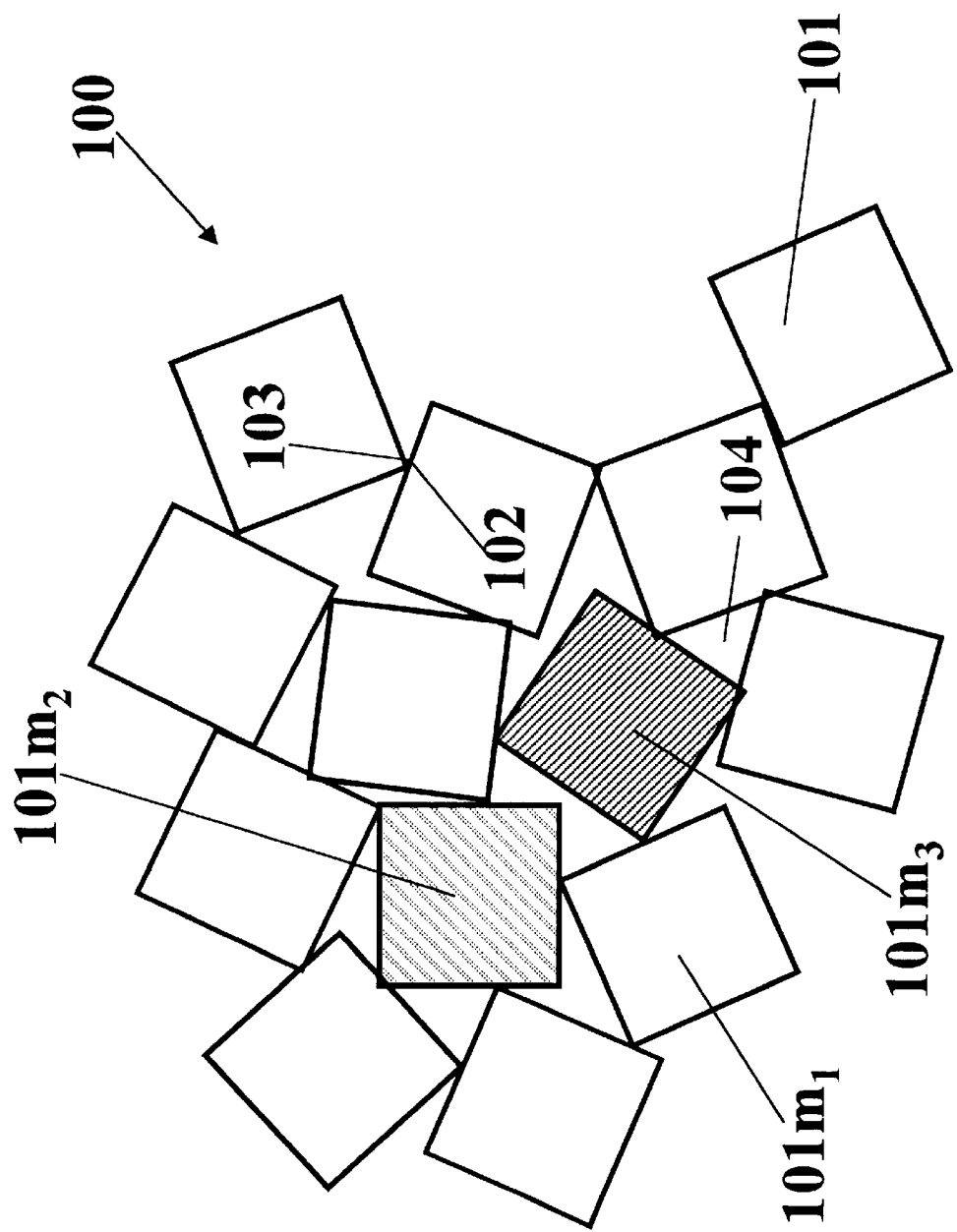
FIG. 6 is a diagrammatic plan view of an embodiment of an inventive matrix system wherein the particles are approximately rectangular parallelepiped.

The contact regions 103 associated with utilization of multi-faceted (multi-faced) particles 101 may significantly differ (e.g., in area, number and location) from the contact regions 103 associated with utilization of "smooth" particles 101, even if "faceted" particles 101 and "smooth" particles 101 are comparably sized. As a "rule of thumb," implementation of planar (flat) surfaces vis-a-vis' curved surfaces will increase the sizes (areas) of the contact regions 103. For instance, it may be preferable for a particular application that matrix 100 comprise "facetedly" spherical particles 101 such as shown in FIG. 7, rather than or in addition to "smoothly" spherical particles 101 such as shown in FIG. 1 through FIG. 4, FIG. 16 and FIG. 17. As another example, use of some or all rectangular (e.g., square) block-shaped particles 101 such as shown in FIG. 6 may be preferable for a given application. Particle 101 size, particle 101 material and particle 101 shape (e.g., the surface configuration of particle 101, including nuanced aspects thereof) may be considered by the inventive practitioner in designing the inventive matrix 100 damping device with a view toward frequency range(s) and temperature range(s).

Inventive embodiments are possible wherein there is a combination of particles having different chemical (compositional) characteristics—e.g., two or more different kinds of material. FIG. 3, FIG. 5, FIG. 6, FIG. 7, FIG. 8, FIG. 16 and FIG. 17 illustrate, via three different modes of shading of viscoelastic particles 101, the utilization of different types of material within the same matrix 100. Particles 101$m_1$, 101$m_2$ and 101$m_3$ represent particles 101 made of three different materials.

As shown in FIG. 16, spherical particles 101 are in three different sizes, viz., particles 101$x$, particles 101$y$ and particles 101$z$. Further, for each spherical particle 101 of the same size, there are three different material types. Hence, particles 101$x$ are represented in three different material forms as particles 101$xm_1$, 101$xm_2$ and 101$xm_3$; particles 101$y$ are represented in three different material forms as particles 101$ym_1$, 101$ym_2$ and 101$ym_3$; particles 101$z$ are represented in three different material forms as particles 101$zm_1$, 101$zm_2$ and 101$zm_3$.

FIG. 17 shows a veritable "medley" of particles 101 characterized by three different shapes, each being of two different sizes, as well as by three different material compositions for each shape and size. Particles 101$a$, 101$b$ and 101$c$ are spherical, round oblong and rectangular, respectively. Particles 101$a$ are represented in two different sizes 101$ax$ and 101$ay$. Particles 101$b$ are represented in two different sizes 101$bx$ and 101$by$. Particles 101$c$ are represented in two different sizes 101$cx$ and 101$cy$. Particles 101$ax$ are represented in three different material forms as particles 101$axm_1$, 101$axm_2$ and 101$axm_3$. Particles 101$bx$ are represented in three different material forms as particles 101$bxm_1$, 101$bxm_2$ and 101$bxm_3$. Particles 101$cx$ are represented in three different material forms as particles 101$cxm_1$, 101$cxm_2$ and 101$cxm_3$. Particles 101$ax$ are represented in three different material forms as particles 101$axm_1$, 101$axm_2$ and 101$axm_3$. Particles 101$by$ are represented in three different material forms as particles 101$bym_1$, 101$bym_2$ and 101$bym_3$. Particles 101$cy$ are represented in three different material forms as particles 101$cym_1$, 101$cym_2$ and 101$cym_3$.

Again, in accordance with the present invention, a collection of practically identical particles will accomplish a specifically desired damping capability. However, a mixture of sizes and/or shapes and/or material compositions characterizing the inventive particles will also accomplish a specifically desired damping capability—generally, a broader capability that will be associated with particle homogeneity. A homogeneous or singular inventive approach to inventive practice, in terms of shape, size and material, can achieve (i) a specific damping versus frequency of the to-be-damped object, and/or (ii) a specific damping versus temperature response from the damper. However, a heterogeneous or conglomeratic approach to inventive practice, which varies at least one parameter among shape, size and material, can achieve, relatively speaking, (i) a specific, more extensive damping versus frequency of the to-be-damped object, and/or (ii) a specific, more extensive damping versus temperature response from the damper. In other words, inventive diversification can broaden the damping coverage in one or more certain respects.

As previously mentioned herein, many preferred inventive embodiments implement approximately uniformly sized spheres of the same viscoelastic material composition, such as shown in FIG. 1 through FIG. 4. Nevertheless, alternative inventive configurational possibilities are endless. The choice of particle shape (and size) will be dictated by the packing or particle contact that the design needs for functionality. A minimum inventive requirement is that the particle shape(s) does(do) not allow a hundred percent (100%) touch—i.e., that the result not amount to, in essence, a solid continuum of material. The porousness of matrix 100 is a critical feature in terms of damping functionality of the inventive system.

Of course, economics may influence certain decisions about how to practice the present invention, particularly with regard to the characteristics of the viscoelastic particles 101. Unusual particle shapes may be extremely expensive.

Figure 9:
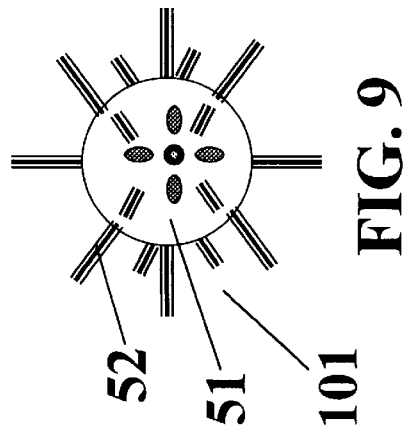
FIG. 9 through FIG. 15 are diagrammatic perspective views of inventive particles of various shapes.
Figure 10:
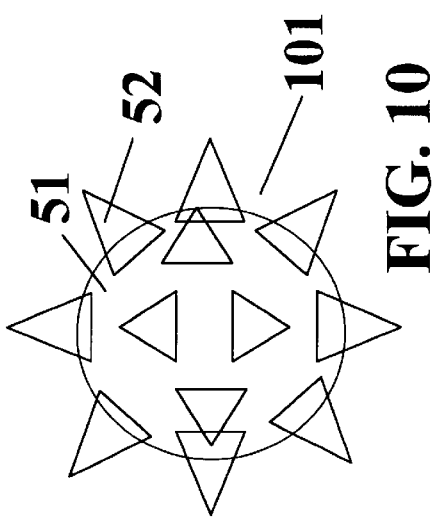
Figure 11:
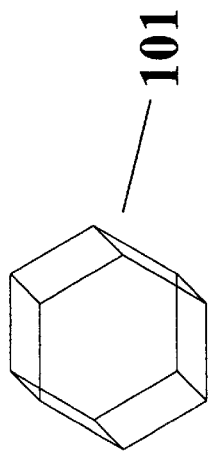
Figure 12:
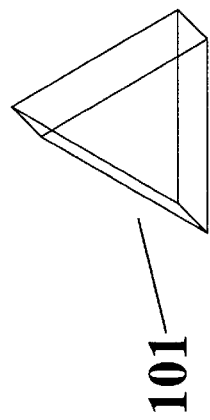
Figure 13:
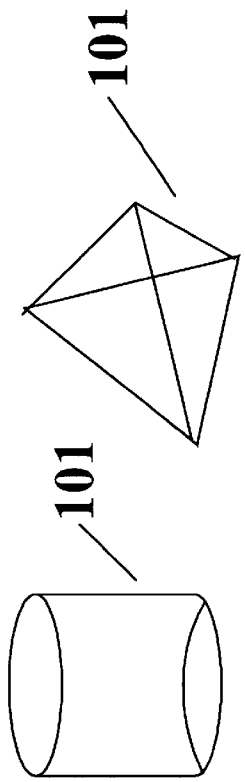
Figure 14:
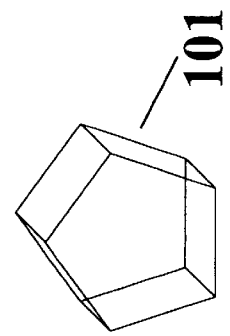
Figure 15:
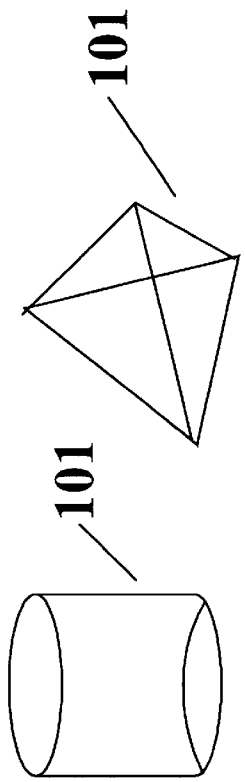

Some interesting particle 101 shapes might prove promising and present some unique opportunities for practicing this invention. For instance, particles 101 such as shown in FIG. 9 and FIG. 10 comprise core spheres 51 and little "fingers" or protrusions 52 projecting therefrom. It is conceptually recognized in accordance with this invention that unique particle 101 shapes such as shown in FIG. 9 and FIG. 10 can result in local high strain amplitudes which will enhance the damping effectiveness, but this inventive phenomenon has not been demonstrated.

Accordingly, a particle 101 matrix 100 in accordance with the present invention can provide singular or plural particle 101 shapes, and/or singular or plural particle 101 sizes, and/or singular or plural particle 101 materials. Generally, in the more complex inventive combinations of particles 101, an inventive damper system is developed having extended frequency capability; that is, the frequency capability is extended vis-a-vis' a simpler inventive damper system having uni-shape, uni-size, uni-material particles 101.

For instance, by implementing larger and smaller particle 101 sizes, the larger sized particle 101 medium will have a lower frequency starting point than the smaller sized particle 101 medium. Basically, the damping starts high and then drops to a lower constant value with typical embodiments of an inventive damping device; hence, by having a first damping subsystem associated with a first particle size, and a second damping subsystem associated with a second particle size, the inventive practitioner will be able to maintain a higher level of damping over a broader frequency range. The first particle 101 size medium will "kick in" at a lower frequency, the second particle 101 size medium will "kick in" at a higher frequency.

Conceptually speaking, there are limits to how many of these alternate subsystems one can design into a single inventive damping device; however, the present inventors have not significantly explored these limits in a practical sense. Again, in all of these cases the inventive practitioner obtains at least two subsystems within the damping device, wherein each subsystem has different frequency and temperature characteristics. By using two different particle 101 materials, for instance, one can compel each damping subsystem to operate over different temperature ranges and thereby increase the temperature range of damping effectiveness for the inventive damping device.

As discussed elsewhere herein, the physical and material properties of the viscoelastic particles 101 are critical to the present invention. The sizes and shapes of particles 101 influence the degrees and locations of contiguity between and among them. Typical inventive embodiments will provide particles 101 each having a length (i.e., a measurement or extent along its greatest dimension, e.g., taken diametrically or widthwise) in the approximate range between 0.05 inches and 0.5 inches. Further, typical embodiments will provide particles each having a shear modulus in the approximate range between 10 p.s.i. and 100,000 p.s.i., and/or a loss factor in the approximate range between 0.05 and 1.5.

The inventive damping system is quite distinguishable, for example, from a product manufactured by Advanced Polymers International ("API"), a division of Paper Conversions, Inc., 3584 Walters Road, Syracuse, N.Y., 13209, http://www.msphere.com/. Advanced Polymers International manufactures a sheet product, having the trademark MicroSorb® Elastomer, which includes "microspheres." API advertises, inter alia (see http://www.msphere.com/micros.htm) the following: "API's acrylic, pressure sensitive adhesive microspheres are manufactured in a variety of sizes. Standard sizes include 25, 35 and 45 micron average particle diameter. Other sizes are available on a developmental or custom manufacture basis." API further advertises, inter alia, as follows (see http://www.msphere.com/microe.htm): "Microsorb elastomers are unique viscoelastic sheet materials manufactured using acrylic microspheres. MicroSorb elastomer features properties of shock absorption and vibration dampening. The partially adhesive nature of MicroSorb elastomer allows for positive positioning of die-cut parts during product assembly . . . In place of the simple cell compression that characterizes foam shock absorbers, Microsorb elastomer's solid state foam absorbs shock in two stages: First cell deformation, then cell displacement. The millions of tiny spheres that create MicroSorb elastomer's solid state foam structure make possible two-stage shock absorption. First stage cell deformation combines with second stage lateral cell displacement to produce a unique shock absorbing mechanism. Microsorb elastomer's cells are deformable but non-compressible. They change shape under low loads and are pushed aside by higher loads . . . Microsorb comes supplied in sheet form 24"×24" (nominal). The sheet material is protected by a silicone release paper or film which is compatible with most die-cutting methods. Custom shapes and sizes are available upon request."

API's product and the present invention's product implement very dissimilar materials and components, and effectuate entirely different damping mechanisms. The much smaller and much softer (less stiff, less firm, less rigid, more flexible, more highly viscoelastic) acrylic microspheres of API's product are designed to deform in a non-resonant manner and therefore impart damping through a simple viscoelastic deflection. By comparison, the much larger and much harder (stiffer, firmer, more rigid, less flexible, less highly viscoelastic) particles of the present invention's product are designed to act as damped, tuned energy absorbers in an arrangement wherein a resonance is set up through the thickness of the inventive product's coherently adhered (e.g., sintered) material.

According to this invention, the damping system has a firm, "structural" quality such that it is useful as an externally applied damping treatment for stiff structures. By comparison, according to API, their soft product will not be useful as an externally applied damping treatment for stiff structures. The API product is intended to be coupled with an object and to nonresonantly deform, thus affording damping by behaving deflectingly (i.e., by viscoelastically deflecting). Although an acrylic polymer is among the numerous kinds of polymeric materials that would be suitable for inventive practice, the physical properties of an inventive product would differ markedly from those of the API product Vis-a-vis' API's acrylic rubber material, the inventively implemented acrylic rubber material would preferably be characterized by a considerably higher modulus of elasticity in shear (i.e., in the approximate range between 10 p.s.i. and 100,000 p.s.i.), and/or a considerably higher loss factor (i.e., in the approximate range between 0.05 and 1.5).

The present invention, by contrast, is intended to be coupled with an object and to resonantly deform, thus affording damping by behaving resonantly. An inventive device is typically intended to be utilized as an extensional damping treatment, e.g., by being connected to, attached to, affixed to, mounted onto, mounted upon by, or otherwise being securely disposed contiguously or adjacently in relation to, an object to be damped. An inventive extensional damping treatment is rather stiffly supportive of the structure with which it is coupled, rather minimally deforms, and resonates "in tune" with the structure as a tuned damping system. The vibratory resonance of the inventive damping device is a counteractive counterpart to the vibratory resonance of the structure. Generally, for extensional damping treatments, a combination of high stiffness and high damping is required—a combination which the present invention uniquely provides.

Moreover, regardless of material composition and on the basis of size alone, particles as tiny as API's microspheres (advertised to be on the order of 25 to 45 microns) would not lend themselves to inventive practice. Indeed, according to the present invention, particles 101 typically have a length between about one-twentieth of an inch and about one-half of an inch.

Furthermore, API's product has a naturally self-adhesive quality because of the particular soft acrylic material of which the microspheres are made. As distinguished from API's product, the present invention comprises relatively very large and relatively very hard particles which are not naturally adhesive (e.g., "tacky") and which are caused to cohere (adhere together) via any of several processes such as further described hereinbelow (e.g., a process including sintering the particles; a process including coating the particles with heat-curing adhesive; a process including dousing the particles with particle-softening solvent; a process including dousing the particles with evaporable solvent).

With reference to APPENDIX A, the University of Dayton Research Institute (UDRI) developed an analytical model to aid in the design and optimization of polymeric particle-type damping treatments. The analytical process was not completed due to programmatic changes; however, the first attempt by UDRI to model the damping treatment assumed spherical particles fixed relative to one another. This model precluded frictional effects because of the fixed contact points among the particles; yet, good damping was analytically obtained according to this model. The efficacy of the present invention, according to which the particles of a material are actually physically adhered to each other, is lent credence and support by this analytical model.

As stated at page 1 of the report contained in APPENDIX A: "Recent research and development efforts by the Navy have shown that high levels of damping can be achieved in structures composed of hollow metal tubes (i.e., truss structures) when the tubes are filled with beads of polymeric material. Several theories have been proposed to account for the high damping levels which are achieved, with the most widely accepted being that resonant modes of the bead medium couple with the vibration modes in the tube. Thus the beads act as tuned dampers." Similarly, in accordance with the present invention, resonant modes of the viscoelastic particles 101 couple with the vibration modes of the structure with which the inventive device 105 is associated for purposes of damping the structure. The tuned damping afforded by the present invention is based on a principle of modal coupling between the particle matrix's resonances and the damped structure's resonances.

Figure 19:
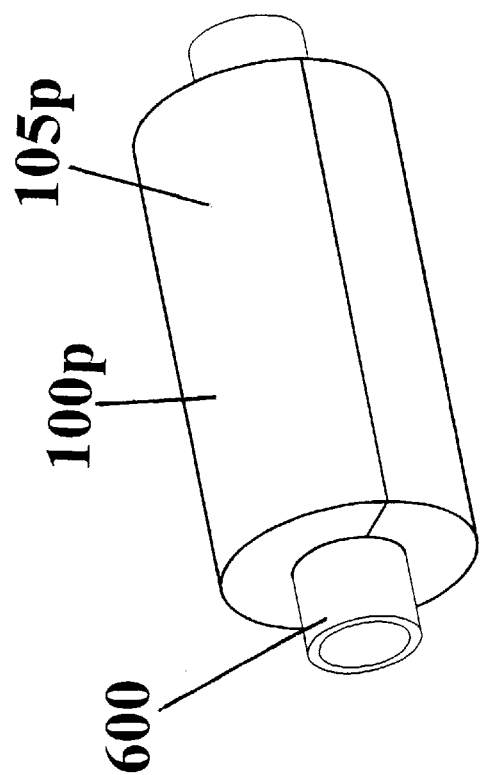
FIG. 19 is a diagrammatic perspective view of an embodiment of an inventive device being utilized, in casted or molded form, for damping of a pipe.
Figure 18:
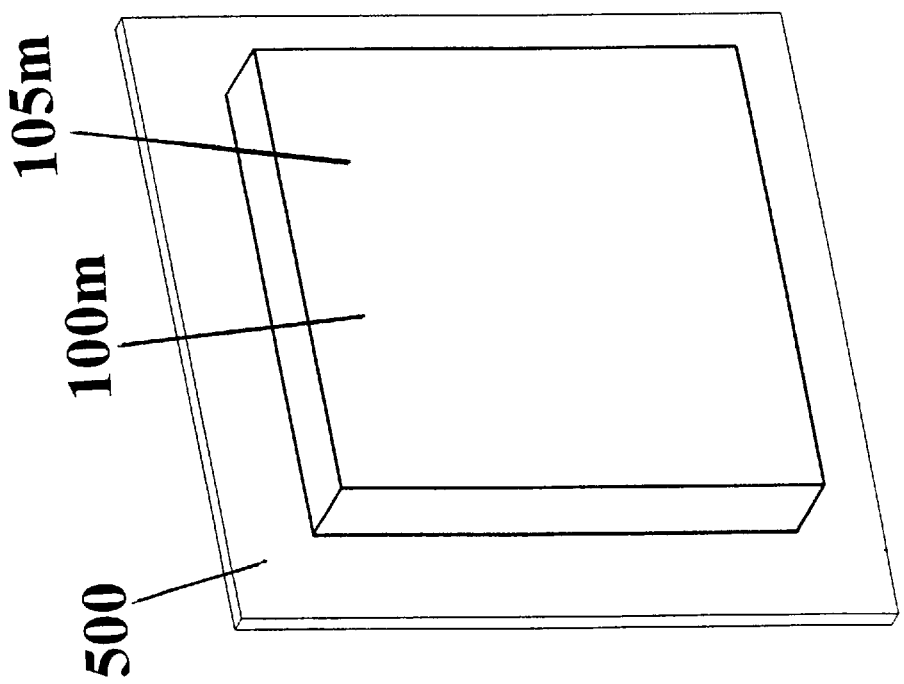
FIG. 18 is a diagrammatic perspective view of an embodiment of an inventive damping device being utilized, in sheet form, for damping of a plate.

With reference to FIG. 18 and FIG. 19, inventive damping device 105 comprises matrix 100. In inventive practice, the matrix 100 device 105 will be manufactured in shapes such as essentially planar (two-dimensional) sheet. forms (such as shown in FIG. 18) or three-dimensional molded forms (such as shown in FIG. 19) so as to allow convenient attachment to any appropriate structure. As shown in FIG. 18, plate damping device 105s, comprising matrix 100s, is a sheet affixed to a plate 500. As shown in FIG. 19, pipe damping device 105p, comprising matrix 100p, is a molded shape which is molded or cast as a hollow cylinder onto, or in conformance with, a pipe 600.

With reference to FIG. 20 through FIG. 23, there are several methods for developing the present invention's particle-to-particle bond. According to the present invention, particles 12 can be adhered to each other using (i) heat, (ii) adhesives or (iii) solvents. Each of these methodologies is discussed hereinbelow briefly in turn. Other manufacturing techniques may be possible in inventive practice.

As shown in FIG. 20, according to a kind of "sintering" process, the particles are heated in a mold to a temperature near the softening point of the material. At this temperature many of the materials that are appropriate for the inventive damping concept become self-adhesive and will automatically bond to each other.

As shown in FIG. 21, according to a process involving adhesive material, the particles are coated with a heat-curing adhesive, placed in a mold, and then bonded together by curing the adhesive.

Figure 22:
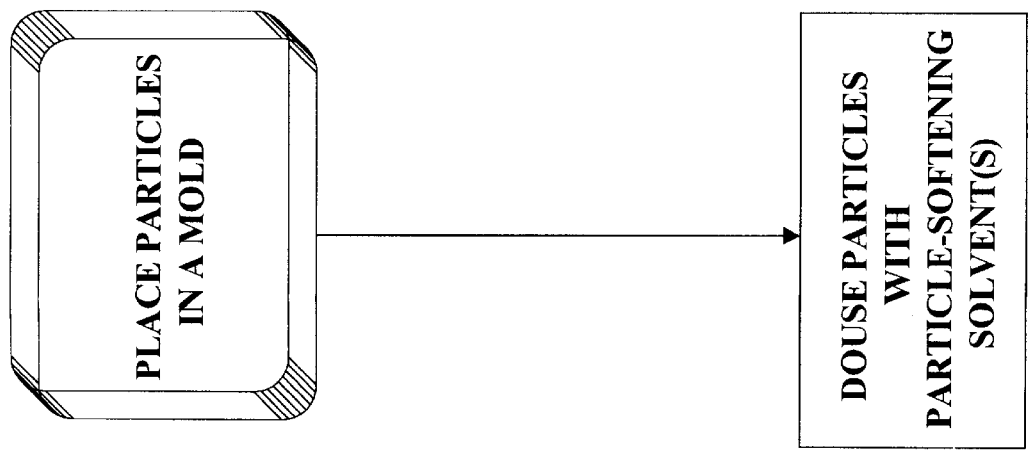
FIG. 22 is a block diagram illustrating a method of fabrication of an inventive device wherein the particles are immersed in one or more solvents which soften the particles, resulting in adherence of the particles.

As shown in FIG. 22, according to a process involving a solvent material, the particles are loaded into a mold. Then, the mold is flushed with a solvent (or solvents) suitable for the particle material insofar as such solvent(s) will soften the particle material, thereby causing the particles to bond to each other.

Figure 23:
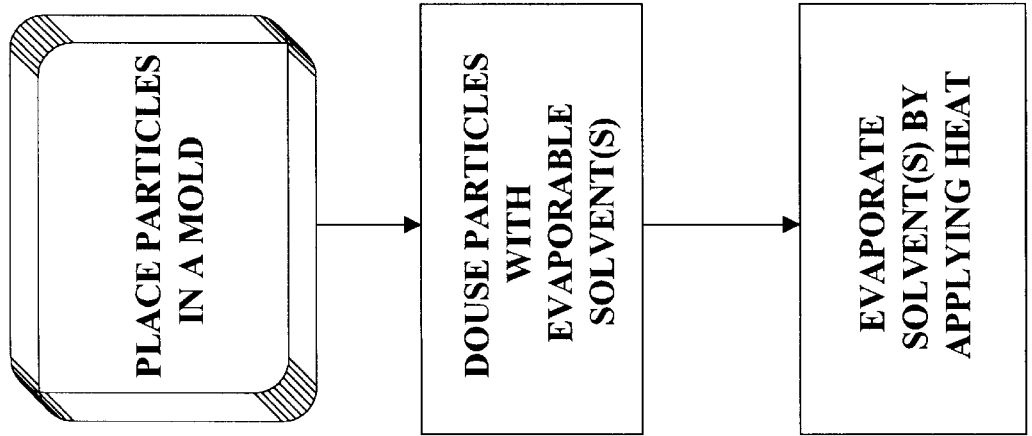
FIG. 23 is a block diagram illustrating a method of fabrication of an inventive device wherein the particles are immersed in one or more solvents which evaporate in response to the application of heat, resulting in adherence of the particles.

As shown in FIG. 23, according to an alternative process involving a solvent material, the particles are loaded into a mold. Then, the mold is flushed with one or more suitable solvents, such as a plastisol or an organisol. Then, as the mold is heated to drive off the solvent(s) used, the bonding of the particles results.

In accordance with the present invention, any of the processes described hereinabove will result in the bonding together of particles 101. The noun "mold," as used herein in connection with placement of particles 101 in a "mold," is intended herein to refer to any frame, model or other molding apparatus which can serve to delimit the aggregation of particles 101 in any sheet-like or non-sheet-like form. The inventive processes such as described herein can be used to generate any required shape of the inventive damping matrix 100 material 105, ranging from sheets to specifically molded configurations. The ordinarily skilled artisan is familiar with diverse methods and techniques which are used in pertinent arts such as the rapid prototyping field. In the light of this disclosure, many of the currently used processes in these arts will be understood by the ordinarily skilled artisan to be applicable for generating various shapes of the inventive damping system.

Any number of viscoelastic particles 101 can be used in accordance with the present invention. According to usual inventive practice, tens, hundreds or thousands of particles 101 are utilized as part of a given matrix 100, such that it will be suitable for engagement with a particular structure to be damped. A minimum number of ten particles 101 will describe the vast majority of inventive embodiments.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A passive vibration damping device comprising plural viscoelastic particles which generally cohere with one another, wherein at least substantially every said particle is characterized by:
  adherent communication with at least one other said particle;
  adjacency to at least one separation between said particle and at least one other said particle; and
  at least one of:
    an approximate shear modulus in the range between about 10 p.s.i. and about 100,000 p.s.i. inclusive; and
    an approximate loss factor in the range between about 0.05 and about 1.5 inclusive.

2. A device as recited in claim 1, wherein said adherent communication includes:
  a contact region between two said particles; and
  a bond region therebetween which is at least approximately commensurate with said contact region.

3. A device as recited in claim 1, wherein at least substantially every said particle is characterized by size in the range between about 0.05 inches and about 0.5 inches inclusive.

4. A device as recited in claim 1, wherein at least substantially every said particle is characterized by an at least approximately spherical shape.

5. A device as recited in claim 4, wherein at least substantially every said particle is characterized by at least approximately the same diameter.

6. A device as recited in claim 4, wherein at two said particles are characterized by different diameters.

7. A device as recited in claim 1, wherein at least substantially every said particle is characterized by an approximate shape selected from the group consisting of spherical, oblate spherical, rectangular parallelepiped.

8. A device as recited in claim 1, wherein at least one said particle includes a core and a plurality of projections, said core being characterized by an at least approximately spherical shape.

9. A device as recited in claim 1, wherein at least one said particle is characterized by curvlinearity.

10. A device as recited in claim 1, wherein at least one said particle is characterized by rectilinearity.

11. A device as recited in claim 1, wherein at least substantially every said particle is characterized by:
  at least approximately the same size;
  at least approximately the same shape; and
  at least approximately the same material composition.

12. A device as recited in claim 1, wherein:
  at least substantially every said particle is characterized by at least approximately the same size and at least approximately the same shape; and
  at least two said particles are characterized by different material compositions.

13. A device as recited in claim 1, wherein:
  at least substantially every said particle is characterized by at least approximately the same size;
  at least two said particles are characterized by different shapes; and
  at least substantially every said particle is characterized by the same material composition.

14. A device as recited in claim 1, wherein:
  at least two said particles are characterized by different sizes; and
  at least substantially every said particle is characterized by at least approximately the same shape and at least approximately the same material composition.

15. A device as recited in claim 1, wherein:
  at least substantially every said particle is characterized by at least approximately the same size;
  at least two said particles are characterized by different shapes; and
  at least two said particles are characterized by different material compositions.

16. A device as recited in claim 1, wherein:
  at least two said particles are characterized by different sizes;
  at least two said particles are characterized by different shapes; and
  at least substantially every said particle is characterized by at least approximately the same material composition.

17. A device as recited in claim 1, wherein:
  at least two said particles are characterized by different sizes;
  at least substantially every said particle is characterized by at least approximately the same shape; and
  at least two said particles are characterized by different material compositions.

18. A device as recited in claim 1, wherein:
  at least two said particles are characterized by different sizes;
  at least two said particles are characterized by different shapes; and
  at least two said particles are characterized by different material compositions.

19. A device as recited in claim 1, wherein at least substantially every said particle is characterized an approximate shear modulus in the range between about 10 p.s.i. and about 100,000 p.s i. inclusive.

20. A device as recited in claim 1, wherein at least substantially every said particle is characterized by an approximate loss factor in the range between about 0.05 and about 1.5 inclusive.

21. A device as recited in claim 1, wherein at least substantially every said particle is characterized by both:
  an approximate shear modulus in the range between about 10 p.s.i. and about 100,000 p.s.i. inclusive; and
  an approximate loss factor in the range between about 0.05 and about 1.5 inclusive.

22. A method for effectuating passive damping of an object, said method comprising:
  (a) providing a device comprising plural viscoelastic particles which generally cohere with one another, at least substantially every said particle being characterized by:
    adherent communication with at least one other said particle;
    adjacency to at least one separation between said particle and at least one other said particle; and
    at least one of: an approximate shear modulus in the range between about 10 p.s.i. and about 100,000 p.s.i. inclusive; and an approximate loss factor in the range between about 0.05 and about 1.5 inclusive; and
  (b) coupling said device with said object.

23. A method for effectuating passive damping as recited in claim 22, wherein at least substantially every said particle is characterized by size in the range between about 0.05 inches and about 0.5 inches inclusive.

24. A method for effectuating passive damping as recited in claim 22, wherein said providing a device includes making said device, and wherein said making said device includes:

placing said particles in a mold; and causing said particles to generally cohere with one another.

25. A method for effectuating passive damping as recited in claim 22, wherein said causing said particles to generally cohere includes, after placing said particles in a mold, applying heat and thereby sintering said particles.

26. A method for effectuating passive damping as recited in claim 22, wherein said causing said particles to generally cohere includes, after placing said particles in a mold, dousing said particles with at least one particle-softening solvent.

27. A method for effectuating passive damping as recited in claim 22, wherein said causing said particles to generally cohere includes, after placing said particles in a mold, dousing said particles with at least one evaporable solvent, and applying heat and thereby evaporating said at least one evaporable solvent.

28. A method for effectuating passive damping as recited in claim 22, wherein said causing said particles to generally cohere includes:

before placing said particles in a mold, coating said particles with a heat-curing adhesive; and after placing said particles in a mold, applying heat and thereby curing said adhesive.

29. A method for effectuating passive damping as recited in claim 22, wherein said coupling said device with said object includes coupling said device with said object so that, when said object is subjected to vibrational excitation, said device resonates at at least one frequency range so as to at least partially counteract, in tuned fashion, at least one corresponding frequency range of said vibrational excitation.

30. A method for effectuating passive damping as recited in claim 22, wherein said coupling said device with said object includes coupling said device with said object so that, when said object is subjected to vibrational excitation, said device resonates at at least one frequency in at least one temperature range so as to at least partially counteract, in tuned fashion, at least one corresponding frequency range in at least one corresponding temperature range of said vibrational excitation.

31. A method for making a device suitable for passively damping a structure, said method comprising:

(a) providing plural viscoelastic particles, each said particle being characterized by at least one of:

an approximate shear modulus in the range between about 10 p.s.i. and about 100,000 p.s.i. inclusive; and an approximate loss factor in the range between about 0.05 and about 1.5 inclusive;

(b) placing said particles in a mold; and (c) causing said particles to generally cohere with one another.

32. A method for making as recited in claim 31, wherein at least substantially every said particle is characterized by size in the range between about 0.05 inches and about 0.5 inches inclusive.

33. A method for making as recited in claim 31, wherein said causing said particles to generally cohere includes, after placing said particles in a mold, applying heat so as to sinter said particles.

34. A method for making as recited in claim 31, wherein said causing said particles to generally cohere includes, after placing said particles in a mold, dousing said particles with at least one particle-softening solvent.

35. A method for making as recited in claim 31, wherein said causing said particles to generally cohere includes, after placing said particles in a mold:

dousing said particles with at least one evaporable solvent; and applying heat so as to evaporate said at least one evaporable solvent.

36. A method for making as recited in claim 31, wherein said causing said particles to generally cohere includes:

before placing said particles in a mold, coating said particles with a heat-curing adhesive; and after placing said particles in a mold, applying heat so as to cure said adhesive.

* * * * *